(12) United States Patent
Maeda

(10) Patent No.: US 9,376,014 B2
(45) Date of Patent: Jun. 28, 2016

(54) CONTROL SYSTEM FOR FOUR-WHEEL-DRIVE VEHICLE

(71) Applicant: Toyota Jidosha Kabushiki Kaisha, Toyota-shi, Aichi-ken (JP)

(72) Inventor: Yoshinori Maeda, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/505,850

(22) Filed: Oct. 3, 2014

(65) Prior Publication Data

US 2015/0096814 A1 Apr. 9, 2015

(30) Foreign Application Priority Data

Oct. 7, 2013 (JP) ................................. 2013-210249

(51) Int. Cl.

| | |
|---|---|
| *B60K 23/08* | (2006.01) |
| *B60K 17/344* | (2006.01) |
| *B60K 17/02* | (2006.01) |
| *B62D 11/08* | (2006.01) |
| *B62D 11/00* | (2006.01) |
| *B62D 11/24* | (2006.01) |
| *B60K 23/04* | (2006.01) |

(52) U.S. Cl.

CPC .............. *B60K 23/08* (2013.01); *B62D 11/003* (2013.01); *B62D 11/24* (2013.01); *B60K 17/02* (2013.01); *B60K 17/344* (2013.01); *B60K 2023/043* (2013.01); *B60K 2023/0833* (2013.01)

(58) Field of Classification Search

CPC .. B62K 23/0808; B60K 17/02; B60K 17/344; B62D 11/003; B62D 11/24

USPC ........... 180/233, 245, 247, 248, 249; 475/223
See application file for complete search history.

(56) References Cited

U.S. PATENT DOCUMENTS

| | | | |
|---|---|---|---|
| 8,313,407 B2 | 11/2012 | Ekonen et al. | |
| 2007/0029127 A1* | 2/2007 | Mori .................... | B60K 17/344 180/247 |
| 2009/0277711 A1 | 11/2009 | Hoffmann et al. | |
| 2010/0062891 A1* | 3/2010 | Ekonen .............. | B60K 23/0808 475/223 |
| 2011/0257858 A1 | 10/2011 | Kobayashi et al. | |
| 2011/0275470 A1* | 11/2011 | Ekonen .................. | B60K 17/35 475/198 |

(Continued)

FOREIGN PATENT DOCUMENTS

| | | |
|---|---|---|
| JP | S62-191227 A | 8/1987 |
| JP | 2009-269605 A | 11/2009 |

(Continued)

*Primary Examiner* — Jacob Knutson
(74) *Attorney, Agent, or Firm* — Dinsmore & Shohl LLP

(57) ABSTRACT

A control system includes a transfer. The transfer is disposed in a power transmission path between the driving power source and primary driving wheels and distributes dynamic power of the driving power source to the secondary drive wheels. A driving power transmission shaft transmits the dynamic power of the driving power source distributed by the transfer to the secondary drive wheels. A clutch mechanism is disposed in a power transmission path between the transfer and the driving power transmission shaft. A electronic control unit engages at least one of a first and second clutches and then engages the clutch mechanism on the basis of a steering state at the time of switching from a two-wheel-drive traveling state in which the clutch mechanism and the first and second clutches are disengaged to a four-wheel-drive traveling state in which the clutch mechanism and the first and second clutches are engaged.

8 Claims, 4 Drawing Sheets

(56) References Cited

U.S. PATENT DOCUMENTS

| | | | |
|---|---|---|---|
| 2012/0024614 A1* | 2/2012 | Sigmund | B60K 23/0808 180/248 |
| 2013/0103278 A1* | 4/2013 | Suzuki | B60W 30/045 701/70 |
| 2013/0110366 A1* | 5/2013 | Suzuki | B60K 17/344 701/69 |
| 2014/0336001 A1 | 11/2014 | Imafuku | |

FOREIGN PATENT DOCUMENTS

| | | |
|---|---|---|
| JP | 2011-178185 A | 9/2011 |
| WO | 2010085517 A1 | 7/2010 |
| WO | 2013-093978 A1 | 6/2013 |

* cited by examiner

F I G . 2
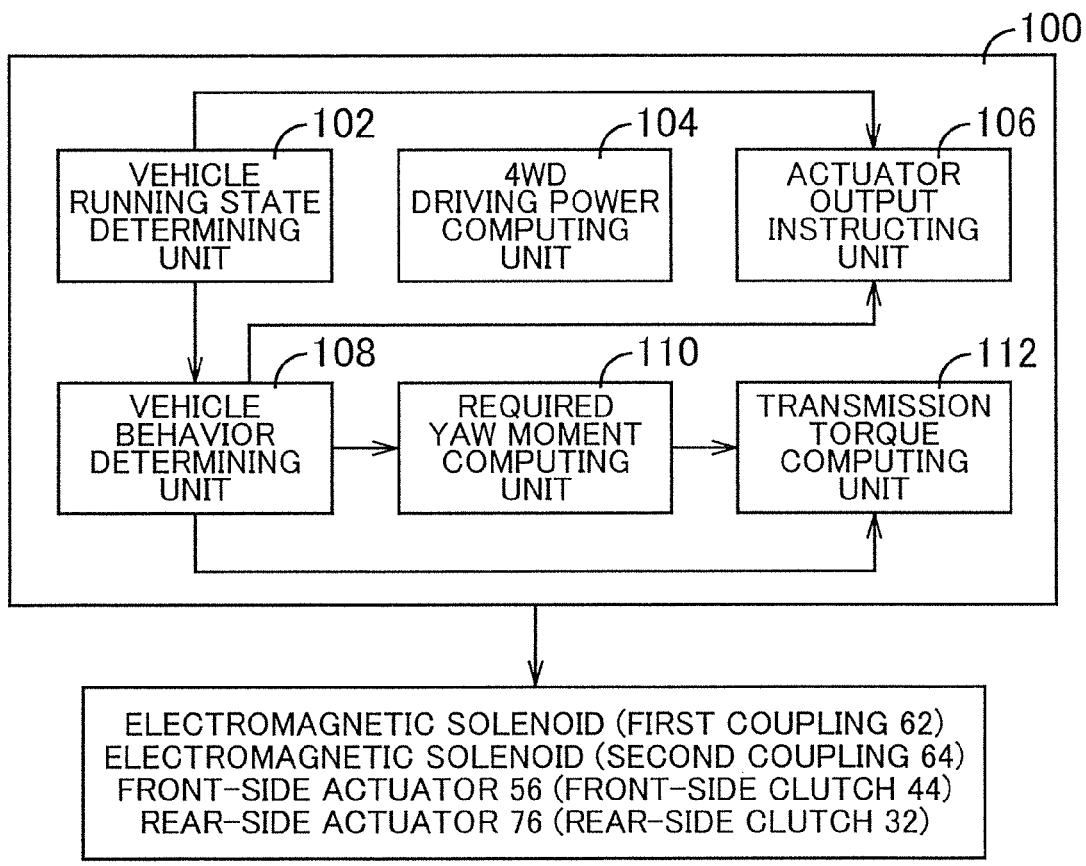

CONTROL SYSTEM FOR FOUR-WHEEL-DRIVE VEHICLE

INCORPORATION BY REFERENCE

The disclosure of Japanese Patent Application No. 2013-210249 filed on Oct. 7, 2013 including the specification, drawings and abstract is incorporated herein by reference in its entirety.

BACKGROUND OF THE INVENTION

1. Field of the Invention

The present invention relates to a control system for switching a traveling state between a two-wheel-drive traveling state and a four-wheel-drive traveling state in a four-wheel-drive vehicle that includes a clutch mechanism disposed closer to a driving power source than a driving power transmission shaft and right and left clutches disposed in power transmission paths to right and left wheels as secondary drive wheels.

2. Description of Related Art

A four-wheel-drive vehicle is well known which includes a connection and disconnection mechanism disposed on a driving power source side of a driving power transmission shaft (for example, propeller shaft) that transmits dynamic power to secondary drive wheels, which serve as driven wheels at the time of two-wheel-drive traveling (2WD traveling), at the time of four-wheel-drive traveling (4WD traveling) and right and left clutches disposed in power transmission paths to the right and left wheels of the secondary drive wheels, respectively, so as to control a transmission torque. An example thereof is described in U.S. Pat. No. 8,313,407 B2. In the four-wheel-drive vehicle, by disengaging the connection and disconnection mechanism and the right and left clutches in a 2WD traveling state in which dynamic power is transmitted to only primary drive wheels for traveling, it is possible to stop rotation of rotation elements (such as the driving power transmission shaft) constituting a part of the power transmission paths between the connection and disconnection mechanism and the right and left clutches. In this case, it is possible to improve fuel efficiency compared with a case where only one of the connection and disconnection mechanism and the right and left clutches is disengaged in the 2WD traveling state.

SUMMARY OF THE INVENTION

U.S. Pat. No. 8,313,407 B2 describes that a traveling state is switched between a 2WD traveling state (hereinafter, referred to as 2WD_d traveling state) in which the connection and disconnection mechanism and the right and left clutches are disengaged and a 4WD traveling state in which the connection and disconnection mechanism and the right and left clutches are engaged, but does not describes a specific control routine at the time of switching from the 2WD_d traveling state to the 4WD traveling state. On the other hand, in the above-mentioned four-wheel-drive vehicle, it can be considered that the right and left clutches are substantially simultaneously engaged, a rotation speed of the driving power transmission shaft of which the rotation is stopped is raised to substantially synchronize the rotation speed with a rotation speed of a driving power source of the connection and disconnection mechanism, and then the connection and disconnection mechanism is engaged, at the time of switching from the 2WD_d traveling state to the 4WD traveling state. However, when a steering wheel is turned at the time of switching from the 2WD_d traveling state to the 4WD traveling state and the right and left clutches are substantially simultaneously engaged as in the above-mentioned switching control routine, it may be difficult to turn the vehicle. On the other hand, when the right and left clutches are not substantially simultaneously engaged but any one clutch thereof is first engaged, understeering or oversteering may be promoted. The above-mentioned problems are not known and the specific control routine at the time of switching from the 2WD_d traveling state to the 4WD traveling state at the time of steering has not been proposed.

The invention provides a control system for a four-wheel-drive vehicle that can generate a yaw moment corresponding to steering at the time of switching from the 2WD_d traveling state to the 4WD traveling state.

According to an aspect of the invention, there is provided a control system for a four-wheel-drive vehicle including a driving power source, primary drive wheels, secondary drive wheels, and a rotation member. The control system includes a transfer, a driving power transmission shaft, a clutch mechanism, a first clutch, a second clutch, and an electronic control unit. The transfer is connected to the rotation member constituting a part of a first power transmission path between the driving power source and the primary driving wheels. The transfer is configured to distribute dynamic power of the driving power source to the secondary drive wheels. The driving power transmission shaft is configured to transmit the dynamic power of the driving power source distributed by the transfer to the secondary drive wheels. The clutch mechanism is disposed in a second power transmission path between the rotation member and the driving power transmission shaft. The clutch mechanism is configured to cut off and set up the second power transmission path. The first clutch is disposed in a third power transmission path between the driving power transmission shaft and a left wheel of the secondary drive wheels. The first clutch is configured to change a transmission torque. The second clutch is disposed in a fourth power transmission path between the driving power transmission shaft and a right wheel of the secondary drive wheels. The second clutch is configured to change a transmission torque. The electronic control unit is configured to switch a vehicle traveling state between a two-wheel-drive traveling state in which the clutch mechanism, the first clutch, and the second clutch are disengaged and a four-wheel-drive traveling state in which the clutch mechanism, the first clutch, and the second clutch are engaged. The electronic control unit is configured to control at least one of the first clutch and the second clutch so as to engage at least one of the first clutch and the second clutch and then to control the clutch mechanism so as to engage the clutch mechanism on the basis of a steering state at the time of switching the vehicle traveling state from the two-wheel-drive traveling state to the four-wheel-drive traveling state.

According to this configuration, first, since only one clutch or both clutches of the first clutch and the second clutch are controlled to be engaged, the rotation speed of the driving power transmission shaft of which the rotation is stopped can be raised so that the rotation speed of the driving power transmission shaft side of the clutch mechanism increases toward the rotation speed of the driving power source side of the clutch mechanism. Accordingly, it is possible to decrease the differential rotation speed of the clutch mechanism and thus to rapidly engage the clutch mechanism. Particularly, at the time of steering, since only one clutch of the first clutch and the second clutch is engaged, interference with turning becomes more difficult compared with a case where both clutches are uniformly engaged. When only one clutch is controlled to be engaged in a state where the clutch mechanism is not engaged, a braking force acts on the secondary drive wheel on the side in which the one clutch is engaged by raising the rotation speed of the driving power transmission shaft of which the rotation is stopped. Accordingly, it is possible to generate a yaw moment. As a result, it is possible to generate a yaw moment corresponding to the steering at the time of switching from the 2WD_d traveling state to the 4WD traveling state.

In the control system, the electronic control unit may be configured to control the clutch mechanism so as to engage the clutch mechanism and then to control both of the first clutch and the second clutch so as to generate a transmission torque in both of the first clutch and the second clutch on the basis of the steering state. According to this configuration, since the transmission torques of both of the first clutch and the second clutch are controlled on the basis of the steering state after the clutch mechanism is engaged, appropriate driving power is generated in the drive wheels. Particularly, at the time of steering, it is possible to generate a yaw moment using the driving power generated in the secondary drive wheels. Accordingly, it is possible to generate a yaw moment corresponding to the steering at the time of switching from the 2WD_d traveling state to the 4WD traveling state.

In the control system, the transmission torque generated in both of the first clutch and the second clutch after the electronic control unit controls the clutch mechanism to engage the clutch mechanism may be a predetermined transmission torque based on a steering angle or a transmission torque for transmitting dynamic power of the driving power source to the secondary drive wheels so as to cause vehicle behavior to approximate a target vehicle turn based on the steering angle. According to this configuration, after the clutch mechanism is engaged, appropriate driving power is generated in the drive wheels even in a non-steered state in which the steering angle is substantially zero. Particularly, at the time of steering, it is possible to generate a yaw moment connection and disconnection using the driving power generated in the secondary drive wheels at the time of steering.

In the control system, the clutch mechanism may be a dog clutch. According to this configuration, by controlling only one clutch or both clutches of the first clutch and the second clutch so as to be engaged, the control routine of engaging the clutch mechanism after raising the rotation speed of the driving power transmission shaft of which the rotation is stopped is useful. That is, by this control routine, the clutch mechanism can be engaged in a state where the differential rotation speed in the clutch mechanism is suppressed.

In the control system, the electronic control unit may be configured to control one, which realizes a turn closer to a turn corresponding to steering than the other, of the first clutch and the second clutch so as to engage the one before controlling the clutch mechanism so as to engage the clutch mechanism at the time of steering. According to this configuration, it is difficult to interfere with turning at the time of steering. A braking force acts on the secondary drive wheel on the side in which the one clutch is engaged and it is thus possible to generate a yaw moment corresponding to the steering.

In the control system, the electronic control unit may be configured to determine whether a steering state is an understeering state or an oversteering state at the time of steering and to control one, which more suppresses the determined understeering state or oversteering state than the other, of the first clutch and the second clutch so as to engage the one before controlling the clutch mechanism so as to engage the clutch mechanism. According to this configuration, it is difficult to interfere with turning at the time of steering. A braking force acts on the secondary drive wheel on the side in which the one clutch is engaged and it is thus possible to generate a yaw moment for suppressing generated understeering or oversteering.

In the control system, the electronic control unit may be configured to control both of the first clutch and the second clutch so as to engage both of the first clutch and the second clutch before controlling the clutch mechanism so as to engage the clutch mechanism in a state other than the steering state. According to this configuration, it is possible to raise the rotation speed of the driving power transmission shaft of which the rotation is stopped and thus to engage the clutch mechanism in a state where the differential rotation speed in the clutch mechanism is suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a functional block diagram illustrating a principal part of a control function of an electronic control unit;

DETAILED DESCRIPTION OF EMBODIMENTS

In the present invention, preferably, a four-wheel-drive vehicle includes a transmission constituting a part of power transmission paths between a driving power source and primary drive wheels. As the transmission, a manual transmission such as a known synchronous mesh type parallel two-axis transmission in which plural pairs of transmission gears are disposed between two axles and various automatic transmissions (such as a planetary gear type automatic transmission, a synchronous mesh type parallel two-axis automatic transmission, a DCT, and a CVT) can be used. The automatic transmission is constituted by a single automatic transmission, an automatic transmission having a hydraulic power transmission device, an automatic transmission having a secondary transmission, or the like. A transfer is connected to an output-side rotation member of the transmission so as to enable power transmission.

Preferably, the four-wheel-drive vehicle includes a second connection and disconnection mechanism that cuts off or sets up a power transmission path between a driving power transmission shaft and a clutch. A connection and disconnection mechanism (clutch mechanism) disposed in the transfer and the second connection and disconnection mechanism (clutch mechanism) is a disconnection mechanism that stops the rotation of a predetermined rotation element for transmitting dynamic power to the secondary drive wheels during the four-wheel-drive traveling by operating during the two-wheel-drive traveling. The predetermined rotation element corresponds to a rotation element interposed between the two disconnection mechanisms out of the rotation elements constituting the power transmission path between the driving power source and the secondary drive wheels. The state in which the predetermined rotation element is stopped by the operation of the disconnection mechanism is a disconnected state of the disconnection mechanism. When the second connection and disconnection mechanism is engaged but the connection and disconnection mechanism and the clutch are disengaged, the same state as the disconnected state can be achieved. That is, the clutch serves as one disconnection mechanism. Accordingly, the four-wheel-drive vehicle sets up, the disconnected state during the 2WD traveling without including the second connection and disconnection mechanism.

Preferably, for example, a gasoline engine or a diesel engine such as an internal combustion engine that generates dynamic power by combustion of fuel can be used as the driving power source, and another motor such as an electric motor may be employed singly or by combination with an engine.

Hereinafter, embodiments of the invention will be described in detail with reference to the accompanying drawings.

Embodiments

Figure 1:
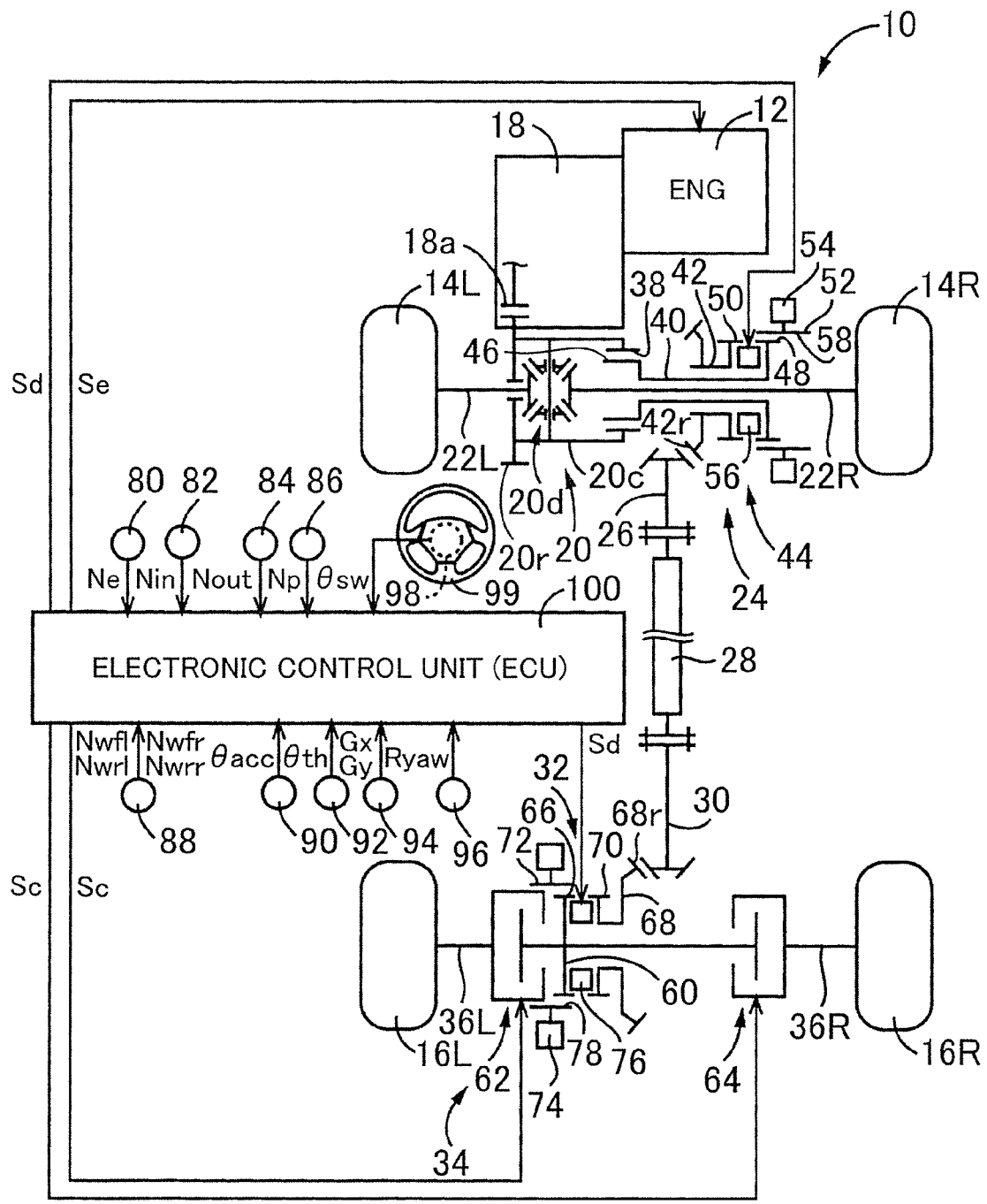
FIG. 1 is a skeletal diagram schematically illustrating a configuration of a four-wheel-drive vehicle to which the invention is applied and is a diagram illustrating a principal part of a control system in the vehicle.

FIG. 1 is a skeletal diagram schematically illustrating a configuration of a four-wheel-drive vehicle 10 (hereinafter, referred to as vehicle 10) to which the invention is applied and is a diagram illustrating a principal part of a control system in the vehicle 10. In FIG. 1, the vehicle 10 includes an engine 12, right and left front wheels 14R, 14L (hereinafter, referred to as front wheels 14 when both are not particularly distinguished), right and left rear wheels 16R, 16L (hereinafter, referred to as rear wheels 16 when both are not particularly distinguished), a first power transmission path which is a power transmission path between the engine 12 and the front wheels 14 and through which dynamic power of the engine 12 is transmitted to the front wheels 14, and a second power transmission path which is a power transmission path between the engine 12 and the rear wheels 16 and through which the dynamic power of the engine 12 is transmitted to the rear wheels 16.

The engine 12 is an internal combustion engine such as a gasoline engine or a diesel engine and is a driving power source that generates driving power. The front wheels 14 are primary drive wheels that serve as a driving wheel in a two-wheel-drive traveling state (2WD traveling state) and a four-wheel-drive traveling state (4WD traveling state). The rear wheels 16 are secondary drive wheels that serve as a driven wheel in the 2WD traveling state and to which dynamic power is transmitted from the engine 12 via the second power transmission path in the 4WD traveling state. Accordingly, the vehicle 10 is a FF-based four-wheel-drive vehicle.

The first power transmission path includes a transmission 18, a front differential 20, and right and left front-wheel axles 22R, 22L (hereinafter, referred to as front-wheel axles 22 when both are not particularly distinguished). The second power transmission path includes the transmission 18, a transfer 24 as a front/rear-wheel power distribution device that distributes the dynamic power of the engine 12 to the rear wheels 16, a driven pinion 26, a propeller shaft 28 as a driving power transmission shaft that transmits dynamic power of the engine 12 distributed by the transfer 24 to the rear wheels 16, a driving pinion 30, a rear-side clutch 32, a right/left driving power distribution device 34, and right and left rear-wheel axles 36R, 36L (hereinafter, referred to as rear-wheel axles 36 when both are not particularly distinguished).

The transmission 18 constitutes a part of a common power transmission path of the first power transmission path between the engine 12 and the front wheels 14 and the second power transmission path between the engine 12 and the rear wheels 16 and transmits dynamic power of the engine 12 to the front wheels 14 side or the rear wheels 16 side. Examples of the transmission 18 include a known planetary gear type multi-stage transmission in which plural transmission stages having different transmission gear ratios γ (=transmission input rotation speed Nin/transmission output rotation speed Nout) are selectively set up, a known continuously-variable transmission in which the transmission gear ratio γ continuously varies in a stepless manner, and a known synchronous mesh type parallel two-axis transmission.

The front differential 20 is a known differential gear that includes a case 20c and a differential mechanism 20d having an umbrella gear and that transmits a rotational force to the right and left front-wheel axles 22R, 22L while appropriately providing a differential rotation to the right and left front-wheel axles 22R, 22L. A ring gear 20r is formed in the case 20c, and the ring gear 20r meshes with an output gear 18a as an output rotation member of the transmission 18. Accordingly, dynamic power output from the transmission 18 is input to the ring gear 20r. Inner circumferential fitting teeth 38 that are fitted to outer circumferential fitting teeth 46 to be described later are formed in the case 20c.

The transfer 24 is disposed in parallel to the front differential 20 as the rotation member constituting a part of the first power transmission path and is connected to the front differential 20. The transfer 24 includes a first rotation member 40, a second rotation member 42, and a front-side clutch 44.

The first rotation member 40 has a substantially cylindrical shape and the front-wheel axle 22R passes through the inner circumference side. The outer circumferential fitting teeth 46 are formed on one side in the axial direction of the first rotation member 40. The first rotation member 40 rotates together with the case 20c of the front differential 20 by fitting the outer circumferential fitting teeth 46 to the inner circumferential fitting teeth 38. Clutch teeth 48 constituting a part of the front-side clutch 44 are formed on the other side in the axial direction of the first rotation member 40.

The second rotation member 42 has a substantially cylindrical shape and the front-wheel axle 22R and the first rotation member 40 pass through the inner circumference side. A ring gear 42r meshing with the driven pinion 26 so as to transmit power of the engine 12 to the rear wheels 16 side is formed on one side in the axial direction of the second rotation member 42. Clutch teeth 50 constituting a part of the front-side clutch 44 are formed on the other side in the axial direction of the second rotation member 42. The driven pinion 26 meshing with the ring gear 42r is connected to the propeller shaft 28 and is connected to the driving pinion 30 via the propeller shaft 28.

The front-side clutch 44 is a clutch that selectively connects and disconnects the first rotation member 40 and the second rotation member 42. The front-side clutch 44 is a dog clutch (that is, mesh type clutch) that includes the clutch teeth 48, the clutch teeth 50, a sleeve 52, a support member 54, and a front-side actuator 56. The sleeve 52 has a substantially cylindrical shape and inner circumferential teeth 58 that can mesh with the clutch teeth 48 and the clutch teeth 50 are formed on the inner circumference side of the sleeve 52. The sleeve 52 is moved in the axial direction, for example, by the front-side actuator 56 that can be electrically (electormagnetically) controlled. The front-side clutch 44 may be further provided with a synchronization mechanism.

FIG. 1 illustrates a state where the front-side clutch 44 is disengaged. In this state, since the first rotation member 40 and the second rotation member 42 are disconnected, dynamic power of the engine 12 is not transmitted to the rear wheels 16. On the other hand, when the sleeve 52 moves and both of the clutch teeth 48 and the clutch teeth 50 mesh with the inner circumferential teeth 58, the front-side clutch 44 is engaged and the first rotation member 40 and the second rotation member 42 are connected to each other. Accordingly, when the first rotation member 40 rotates, the second rotation member 42, the driven pinion 26, the propeller shaft 28, and the driving pinion 30 rotate together. In this way, the front-side clutch 44 is a connection and disconnection mechanism (clutch mechanism) that is disposed on the engine 12 side of the propeller shaft 28 and that cuts off or sets up a power transmission path between the front differential 20 and the propeller shaft 28.

The right/left driving power distribution device 34 is disposed between the rear-side clutch 32 and the rear wheels 16 and is configured to transmit a torque between the rear-side clutch 32 and the rear wheels 16 and to change a driving power distribution of the right and left rear wheels 16R, 16L. The right/left driving power distribution device 34 includes an input gear 60, a first coupling 62 disposed on the rear wheel 16L side, and a second coupling 64 disposed on the rear wheel 16R side. The input gear 60 is a common input rotation member that transmits dynamic power of the engine 12 to the first coupling 62 and the second coupling 64. Clutch teeth 66 constituting a part of the rear-side clutch 32 are formed on the outer circumference of the input gear 60. The first coupling 62 is disposed between the input gear 60 and the rear wheel 16L and is, for example, a known electronically-control coupling constituted by a wet multi-disc clutch. By controlling a transmission torque (clutch torque) of the first coupling 62, the driving power to be transmitted to the rear wheel 16L. Specifically, when a current is supplied to an electromagnetic solenoid (not illustrated) that controls the transmission torque of the first coupling 62, the first coupling 62 is engaged with an engaging force proportional to the current value. As the transmission torque of the first coupling 62 increases, the driving power transmitted to the rear wheel 16L increases. The second coupling 64 is disposed between the input gear 60 and the rear wheel 16R and is, for example, a known electronically-control coupling constituted by a wet multi-disc clutch. By controlling a transmission torque of the second coupling 64, the driving power to be transmitted to the rear wheel 16R. Specifically, when a current is supplied to an electromagnetic solenoid (not illustrated) that controls the transmission torque of the second coupling 64, the second coupling 64 is engaged with an engaging force proportional to the current value. As the transmission torque of the second coupling 64 increases, the driving power transmitted to the rear wheel 16R increases. The right/left driving power distribution device 34 can continuously change the torque distribution to the right and left rear wheels 16R, 16L, for example, between 0:100 and 100:0 by controlling the transmission torque of the first coupling 62 and the transmission torque of the second coupling 64. The right/left driving power distribution device 34 can continuously change the torque distribution to the front wheels 14 and the rear wheels 16, for example, between 100:0 and 50:50 by controlling the transmission torque of the first coupling 62 and the transmission torque of the second coupling 64. In this way, the first coupling 62 and the second coupling 64 are a first clutch and a second clutch that are disposed in the power transmission paths between the propeller shaft 28 and the right and left rear wheels 16R, 16L, respectively, so as to control the transmission torques.

The vehicle 10 further includes a power transmission member 68 between the driving pinion 30 and the rear-side clutch 32. The power transmission member 68 has a substantially cylindrical shape and a shaft provided with the input gear 60 passes through on the inner circumference side. A ring gear 68r meshing with the driving pinion 30 so as to receive the dynamic power of the engine 12 transmitted from the front wheels 14 side is formed on one side in the axial direction of the power transmission member 68. Clutch teeth 70 constituting a part of the rear-side clutch 32 are formed on the other side in the axial direction of the power transmission member 68.

The rear-side clutch 32 is a clutch that is disposed between the power transmission member 68 and the input gear 60 and that selectively cuts off or sets up a power transmission path therebetween. The rear-side clutch 32 is a dog clutch that includes the clutch teeth 66, the clutch teeth 70, a sleeve 72, a support member 74, and a rear-side actuator 76. The sleeve 72 has a substantially cylindrical shape and inner circumferential teeth 78 that can mesh with the clutch teeth 66 and the clutch teeth 70 are formed on the inner circumference side of the sleeve 72. The sleeve 72 is moved in the axial direction, for example, by the front-side actuator 76 that can be electrically (electormagnetically) controlled. The rear-side clutch 32 may be further provided with a synchronization mechanism.

FIG. 1 illustrates a state where the rear-side clutch 32 is disengaged. As illustrated in the drawing, in the state where the inner circumferential teeth 78 do not mesh with the clutch teeth 66 and the clutch teeth 70, since the power transmission member 68 and the input gear 60 are disconnected, the power transmission path between the driving pinion 30 and the right/left driving power distribution device 34 is cut off and the dynamic power of the engine 12 is not transmitted to the right/left driving power distribution device 34. On the other hand, when the sleeve 72 moves and both of the clutch teeth 66 and the clutch teeth 70 mesh with the inner circumferential teeth 78, the rear-side clutch 32 is engaged and the power transmission member 68 and the input gear 60 are connected to each other. Accordingly, when the dynamic power of the engine 12 is transmitted to the driving pinion 30, the dynamic power is transmitted to the right/left driving power distribution device 34. In this way, the rear-side clutch 32 is a second connection and disconnection mechanism (clutch mechanism) that is disposed on the rear wheels 16 side of the propeller shaft 28 and that cuts off or sets up a power transmission path (particularly, a power transmission path between the propeller shaft 28 and the right/left driving power distribution device 34) between the engine 12 and the rear wheels 16.

In the vehicle 10 having the above-mentioned configuration, for example, when both of the front-side clutch 44 and the rear-side clutch 32 are engaged and the transmission torque of the first coupling 62 and/or the second coupling 64 is controlled to be a value greater than zero, the driving power corresponding to the transmission torque of the first coupling 62 and/or the second coupling 64 is transmitted to the rear wheels 16. Accordingly, dynamic power is transmitted to all of the front wheels 14 and the rear wheels 16 and the traveling state is switched to the 4WD traveling state. In the 4WD traveling state, the torque distribution to the front wheels 14 and the rear wheels 16 and the torque distribution to the right and left rear wheels 16R, 16L are adjusted if necessary by controlling the transmission torque of the first coupling 62 and/or the second coupling 64.

In the vehicle 10, for example, when the front-side clutch 44 is disengaged, the first rotation member 40 and the second rotation member 42 are disconnected from each other and thus dynamic power is not transmitted to the rear wheels 16. Accordingly, the traveling state is switched to the 2WD traveling state in which only the front wheels 14 are driven. For example, when the rear-side clutch 32 is disengaged, the power transmission member 68 and the right/left driving power distribution device 34 are disconnected from each other and thus rotation is not transmitted from any of the engine 12 side and the rear wheels 16 to the rotation elements (the second rotation member 42, the driven pinion 26, the propeller shaft 28, the driven pinion 30, the power transmission member 68, and the like) constituting the power transmission path from the second rotation member 42 to the power transmission member 68 in the 2WD traveling state. Accordingly, in the 2WD traveling state, the rotations of the rotation elements are stopped and the simultaneous rotation of the rotation elements is prevented, and thus the traveling resistance is reduced. The front-side clutch 44 and the rear-side clutch 32 are a disconnection mechanism that is disengaged during the 2WD traveling to stop the rotation of a predetermined rotation element for transmitting dynamic power to the rear wheels 16 during the 4WD traveling. The predetermined rotation element is a rotation member (that is, rotation elements constituting the power transmission path from the second rotation member 42 to the power transmission member 68) interposed between the front-side clutch 44 and the rear-side clutch 32 out of the rotation elements constituting the power transmission path between the engine 12 and the rear wheels 16. The traveling state (that is, the 2WD traveling state in which the simultaneous rotation is prevented) in which the front-side clutch 44 and the rear-side clutch 32 are disengaged and the rotations of the rotation elements are stopped is a disconnected state in which the rotation of the predetermined rotation element is stopped. The 2WD traveling in this disconnected state is referred to as 2WD_d traveling. In the 2WD_d traveling, both of the first coupling 62 and the second coupling 64 are disengaged. When the rear-side clutch 32 is engaged but the front-side clutch 44, the first coupling 62, and the second coupling 64 are disengaged, the same state as the disconnected state is achieved.

In the vehicle 10, when the front-side clutch 44 and the rear-side clutch 32 are engaged and both of the first coupling 62 and the second coupling 64 are disconnected from each other, the input gear 60 and the rear wheels 16 are disconnected from each other and thus dynamic power is not transmitted to the rear wheels 16. Accordingly, the 2WD traveling state in which only the front wheels 14 are driven is achieved. In the 2WD traveling state, since the front-side clutch 44 and the rear-side clutch 32 are connected, the rotation elements (the second rotation member 42, the driven pinion 26, the propeller shaft 28, the driving pinion 30, the power transmission member 68, the input gear 60, and the like) constituting the power transmission path from the second rotation member 42 to the input gear 60 rotates together. Accordingly, as the propeller shaft 28 and the like rotate together in the 2WD traveling state, the fuel efficiency decreases. However, at the time of switching the 2WD traveling state to the 4WD traveling state, the first coupling 62 and/or the second coupling 64 only have to be engaged and it is thus possible to achieve rapid switching.

The vehicle 10 is switched between the 2WD traveling state (including the 2WD_d traveling state) and the 4WD traveling state by controlling the engaged/disengaged states of the front-side clutch 44 and the rear-side clutch 32 or the transmission torques of the first coupling 62 and/or the second coupling 64 depending on the vehicle traveling state.

The vehicle 10 is provided with an electronic control unit (ECU) 100 including a controller of the vehicle 10 that controls the transmission torques of the first coupling 62 and the second coupling 64. The electronic control unit 100 includes a so-called microcomputer having, for example, a CPU, a RAM, a ROM, and an input and output interface. The CPU performs various controls of the vehicle 10 by performing signal processes in accordance with a program stored in advance in the ROM while utilizing a temporary storage function of the RAM. For example, the electronic control unit 100 is configured to perform an output control of the engine 12, a driving state switching control of the vehicle 10, and the like and is divided into a part for the engine control, a part for the driving state control, and the like if necessary. As illustrated in FIG. 1, the electronic control unit 100 is supplied with various actual values (such as an engine rotation speed Ne, a transmission input rotation speed Nin, a transmission output rotation speed Nout, a propeller shaft rotation speed Np, vehicle wheel speeds Nwfl, Nwfr, Nwrl, and Nwrr corresponding to rotation speeds Nw of vehicle wheels (that is, front wheels 14R, 14L and rear wheels 16R, 16L), an accelerator opening θacc, a throttle valve opening θth, a longitudinal acceleration Gx of the vehicle 10, a transverse acceleration Gy of the vehicle 10, a yaw rate Ryaw as the rotational angular velocity of the vehicle 10 about a vertical axis, and a steering angle θsw and a steering direction of a steering wheel 99) based on detection signals of various sensors (such as various rotation speed sensors 80, 82, 84, 86, and 88, an accelerator opening sensor 90, a throttle valve opening sensor 92, a G sensor 94, a yaw rate sensor 96, and a steering sensor 98). As illustrated in FIG. 1, the electronic control unit 100 outputs, for example, an engine output control command signal Se for the output control of the engine 12, an operation command signal Sd for switching the states of the front-side clutch 44 and the rear-side clutch 32, a torque command signal Sc for controlling the clutch torque of the first coupling 62 or the second coupling 64, and the like to a fuel injection unit, an ignition unit, an engine controller such as a throttle actuator, the front-side actuator 56, the rear-side actuator 76, actuators for driving the first coupling 62 or the second coupling 64, and the like. The electronic control unit 100 calculates a speed V of the vehicle 10 (hereinafter, referred to as vehicle speed V) as one of various actual values on the basis of the vehicle wheel speeds Nw. The electronic control unit 100 sets, for example, the average vehicle wheel speed of the vehicle wheel speeds Nw as the vehicle speed V.

FIG. 2 is a functional block diagram illustrating principal parts of the control function of the electronic control unit 100. In FIG. 2, the electronic control unit 100 includes vehicle traveling state determining means, that is, a vehicle traveling state determining unit 102, 4WD driving power computing means, that is, a 4WD driving power computing unit 104, and actuator output instructing means, that is, an actuator output instructing unit 106.

The vehicle traveling state determining unit 102 determines an optimal driving state (traveling state) of the vehicle 10 on the basis of information such as various signals. Specifically, when it is determined that the traveling state of the vehicle is in a normal traveling state in which the variation in the driving power of the vehicle 10 is less than a driving power variation threshold value which is calculated in advance by experiment or design and stored (that is, predetermined) on the basis of the accelerator opening θacc and the vehicle speed V, the vehicle traveling state determining unit 102 determines that the traveling state of the vehicle 10 is set to the 2WD_d traveling in which the vehicle runs with the front-side clutch 44, the rear-side clutch 32, the first coupling 62, and the second coupling 64 disengaged. On the other hand, when it is determined that the variation in the driving power is greater than the driving power variation threshold value, the vehicle traveling state determining unit 102 determines that the traveling state of the vehicle 10 is set to the 4WD traveling state in which the vehicle runs with the front-side clutch 44 and the rear-side clutch 32 engaged and with the first coupling 62 and the second coupling 64 engaged or slip-engaged. The vehicle traveling state determining unit 102 determines whether the vehicle 10 is turning on the basis of whether the absolute values of the steering angle θsw, the transverse acceleration Gy, and the yaw rate Ryaw are equal to or greater than turn determination threshold values θswth, Gyth, and Ryawth, and determines that the traveling state of the vehicle 10 is set to the 2WD_d traveling when it is determined that the vehicle 10 is not turning. When it is determined that a road surface is a low-∥ road such as a snowy road on the basis of the vehicle wheel speeds Nw, information from a navigation system (not illustrated), and the like, the vehicle traveling state determining unit 102 determines that the traveling state of the vehicle 10 is set to the 4WD traveling state. When it is determined that any of the rotation speed differences among the vehicle wheels is greater than a predetermined rotation difference on the basis of the vehicle wheel speeds Nw, the vehicle traveling state determining unit 102 determines that the traveling state of the vehicle 10 is set to the 4WD traveling state. The turn determination threshold values θswth, Gyth, and Ryawth are, for example, predetermined determination values for determining whether the vehicle 10 is turning. For example, the turn determination threshold values θswth, Gyth, and Ryawth may be determined in advance to be constant values or may be determined in advance to be values varying depending on the vehicle speed V or the like. The predetermined rotation difference is, for example, a predetermined 4WD determination threshold value for determining whether the driving state of the vehicle 10 is set to the 4WD traveling state. The predetermined rotation difference may be determined in advance to the same value between the vehicle wheels or may be determined in advance to be different values between the vehicle wheels. For example, when a known 2WD/4WD switching button which is operated by a driver is provided in the vehicle 10, the vehicle traveling state determining unit 102 may determine whether the traveling state of the vehicle is set to the 2WD traveling state or the 4WD traveling state, for example, on the basis of the operating state of the 2WD/4WD switching button.

The 4WD driving power computing unit 104 calculates an optimal front/rear-wheel driving power distribution on the basis of the information such as various signals. Specifically, the 4WD driving power computing unit 104 calculates an estimated value (estimated engine torque) Tep of the engine torque Te on the basis of the engine rotation speed Ne, the throttle valve opening θth, and the like and calculates the front/rear-wheel driving power distribution so as to secure maximum acceleration performance. When it is determined that the operating state by the driver or the variation of the driving power of the vehicle 10 is stabilized on the basis of the throttle valve opening θth, the vehicle speed V, and the vehicle wheel speeds Nw, and the like, the 4WD driving power computing unit 104 decreases the driving power distribution to the rear wheels 16 to achieve a state close to the front-wheel-drive state, thereby improving the fuel efficiency. In order to prevent a tight braking phenomenon at the time of turning at a low speed, the 4WD driving power computing unit 104 decreases the driving power distribution to the rear wheels 16.

When it is determined by the vehicle traveling state determining unit 102 that the traveling state of the vehicle is set to the 2WD_d traveling state, the 4WD driving power computing unit 104 sets the driving power distribution to the rear wheels 16 to zero.

In order to achieve the traveling state determined by the vehicle traveling state determining unit 102 and the front/rear-wheel driving power distribution calculated by the 4WD driving power computing unit 104, the actuator output instructing unit 106 outputs various command signals to the front-side actuator 56 that switches the engaged and disengaged states of the front-side clutch 44, the rear-side actuator 76 that switches the engaged and disengaged states of the rear-side clutches 32, an electromagnetic solenoid (not illustrated) that controls the transmission torque of the first coupling 62, and an electromagnetic solenoid (not illustrated) that controls the transmission torque of the second coupling 64. Specifically, when it is determined by the vehicle traveling state determining unit 102 that the traveling state of the vehicle is set to the 2WD_d traveling state, the actuator output instructing unit 106 outputs commands for disengaging the front-side clutch 44 and the rear-side clutch 32 and setting the transmission torques of the first coupling 62 and the second coupling 64 to zero to the front-side actuator 56, the rear-side actuator 76, and the electromagnetic solenoids. When it is determined by the vehicle traveling state determining unit 102 that the traveling state of the vehicle is set to the 4WD traveling state, the actuator output instructing unit 106 outputs commands for engaging the front-side clutch 44 and the rear-side clutch 32 and controlling the transmission torques of the first coupling 62 and the second coupling 64 to the front-side actuator 56, the rear-side actuator 76, and the electromagnetic solenoids so as to achieve the 4WD traveling with the front/rear-wheel driving power distribution calculated by the 4WD driving power computing unit 104.

Particularly, at the time of switching from the 2WD_d traveling state to the 4WD traveling state, first, the actuator output instructing unit 106 outputs a command for engaging the rear-side clutch 32 to the rear-side actuator 76. This is to engage the rear-side clutch 32 in a state where the rotations of the power transmission member 68 and the input gear 60 are stopped, that is, in a state where the rotation speed of the power transmission member 68 and the rotation speed of the input gear 60 are substantially synchronized with each other. Thereafter, the actuator output instructing unit 106 outputs the commands for substantially simultaneously generating the transmission torques in the first coupling 62 and the second coupling 64 to the electromagnetic solenoids, respectively, and controls both couplings of the first coupling 62 and the second coupling 64 so as to engage both couplings. This is to raise the rotation speed of the propeller shaft 28 of which the rotation is stopped so as to achieve synchronization of the rotation speed of the first rotation member 40 and the rotation speed of the second rotation member 42 with each other so as to engage the front-side clutch 44. After it is determined by the vehicle traveling state determining unit 102 that the rotation speed of the first rotation member 40 and the rotation speed of the second rotation member 42 are substantially synchronized with each other, the actuator output instructing unit 106 outputs a command for engaging the front-side clutch 44 to the front-side actuator 56. Thereafter, the actuator output instructing unit 106 outputs commands for generating the transmission torques in the first coupling 62 and the second coupling 64 to the electromagnetic solenoids, respectively, so as to achieve the front/rear-wheel driving power distribution calculated by the 4WD driving power computing unit 104. The vehicle traveling state determining unit 102 determines whether the rotation speed of the first rotation member 40 and the rotation speed of the second rotation member 42 are substantially synchronized with each other, for example, on the basis of whether the absolute value of the rotation speed difference between the rotation speed of the first rotation member 40 and the rotation speed of the second rotation member 42 is equal to or less than a synchronization determination threshold value ΔNth. The rotation speed of the first rotation member 40 and the rotation speed of the second rotation member 42 may be rotation speeds directly detected by rotation speed sensors (not illustrated) or may be rotation speeds into which the corresponding transmission output rotation speeds Nout and the propeller shaft rotation speeds Np are converted. The synchronization determination threshold value ΔNth is, for example, a maximum synchronizable rotation speed difference predetermined as the maximum value of the rotation speed difference at which the front-side clutch 44 can be engaged. The above-mentioned series of control routine for switching the 2WD_d traveling state to the 4WD traveling state is a normal 4WD switching control routine.

When the steering wheel 99 is steered at the time of switching from the 2WD_d traveling state to the 4WD traveling state and the transmission torques are substantially simultaneously generated in the first coupling 62 and the second coupling 64 as in the above-mentioned normal 4WD switching control routine, it may be difficult to turn the steering wheel. Alternatively, when the transmission torque is generated in only one of the first coupling 62 and the second coupling 64, an understeering state or an oversteering state may be promoted depending on in which coupling the transmission torque is generated.

Therefore, at the time of switching from the 2WD_d traveling state to the 4WD traveling state, the electronic control unit 100 first engages the rear-side clutch 32, then controls one or both of the first coupling 62 and the second coupling 64 to engage one or both thereof on the basis of the steering state so as to generate the transmission torque, then controls the front-side clutch 44 so as to be engaged, and then generates the transmission torques in both couplings of the first coupling 62 and the second coupling 64 on the basis of the steering state. For example, when the steering is not performed, the actuator output instructing unit 106 controls both couplings of the first coupling 62 and the second coupling 64 so as to be engaged before controlling the front-side clutch 44 so as to be engaged in the normal 4WD switching control routine. On the other hand, when the steering is performed, the actuator output instructing unit 106 controls the coupling in which a turn corresponding to the steering is implemented (or held) out of the first coupling 62 and the second coupling 64 so as to be engaged before controlling the front-side clutch 44 so as to be engaged. Here, the coupling in which a turn corresponding to the steering is implemented may not necessarily actually implement the turn corresponding to the steering, and is the coupling in which the turn corresponding to the steering is performed (that is, the coupling in which the turn corresponding to the steering is approximated or the coupling in which the turn corresponding to the steering can be held). When the steering is performed, the electronic control unit 100 determines whether the steering state is an understeering state or an oversteering state, and the actuator output instructing unit 106 controls only the coupling in which the determined understeering state or oversteering state is suppressed out of the first coupling 62 and the second coupling 64 so as to be engaged. The one coupling controlled so as to be engaged is the coupling on the rear wheels 16 side in which a braking force for suppressing the determined understeering or oversteering state is generated. The transmission torques generated in both couplings 62, 64 after the front-side clutch 44 is controlled so as to be engaged are transmission torques for transmitting the dynamic power of the engine 12 to the rear wheels 16 so as to cause the vehicle behavior to approximate a target vehicle turn based on the steering angle θsw. When the steering is not performed, the transmission torques are generated in both couplings 62, 64 so as to achieve the front/rear-wheel driving power distribution calculated by the 4WD driving power computing unit 104 in accordance with the normal 4WD switching control routine, but the transmission torques may be considered to be transmission torques based on the steering angle θsw substantially close to zero.

More specifically, the electronic control unit 100 further includes vehicle behavior determining means, that is, a vehicle behavior determining unit 108, required yaw moment computing means, that is, a required yaw moment computing unit 110, and transmission torque computing means, that is, a transmission torque computing unit 112.

The vehicle traveling state determining unit 102 determines, for example, whether the vehicle 10 of which the steering wheel 99 is operated is steered. Specifically, the vehicle traveling state determining unit 102 determines whether the vehicle 10 is steered on the basis of the determination result on whether the absolute value of the steering angle θsw is equal to or greater than a predetermined steering angle θswth2. The predetermined steering angle θswth2 is, for example, a predetermined steering determination threshold value for determining whether the driver operates the steering wheel 99 so as to turn the vehicle 10. For example, the predetermined steering angle θswth2 may be determined in advance to be a constant value or may be determined in advance to be a value varying depending on the vehicle speed V. The predetermined steering angle θswth2 may have the same value as the turn determination threshold value θswth.

For example, when it is determined by the vehicle traveling state determining unit 102 that the vehicle 10 is steered, the vehicle behavior determining unit 108 determines in which of the understeering state and the oversteering state the vehicle behaves. Specifically, the vehicle behavior determining unit 108 calculates a target yaw rate Ryawtgt on the basis of the vehicle speed V, a target stability factor Khtgt, a wheelbase L, a steering angle θsw, and a steering gear ration nsw using a predetermined operational expression like Expression (1). On the basis of the actual yaw rate Ryaw when the target yaw rate Ryawtgt is equal to or greater than zero (Ryawtgt≥0), the vehicle behavior determining unit 108 determines that the vehicle behaves in the understeering state when Expression (2) is established, and determines that the vehicle behaves in the oversteering state when Expression (3) is established. On the other hand, on the basis of the actual yaw rate Ryaw when the target yaw rate Ryawtgt is less than zero (Ryawtgt≥0), the vehicle behavior determining unit 108 determines that the vehicle behaves in the oversteering state when Expression (2) is established, and determines that the vehicle behaves in the understeering state when Expression (3) is established. The target stability factor Khtgt is, for example, a target value of turnability of the vehicle 10 corresponding to the vehicle speed V and is a suitable value predetermined for each vehicle 10. The term (θsw/nsw) in Expression (1) represents the value of a turning angle of the vehicle wheel (tire turning angle)

$$Ryawtgt = V/((1+Khtgt \times V^2) \times L) \times (\theta sw/nsw) \quad (1)$$

$$Ryawtgt - Ryaw \geq 0 \quad (2)$$

$$Ryawtgt - Ryaw < 0 \quad (3)$$

When it is determined by the vehicle behavior determining unit 108 that the vehicle behaves in any of the understeering state and the oversteering state, the required yaw moment computing unit 110 calculates a yaw moment (required yaw moment) Mreq required for the target yaw rate Ryawtgt. Specifically, the required yaw moment computing unit 110 calculates the required yaw moment Mreq which is a feedback control quantity for matching the actual yaw rate Ryaw with the target yaw rate Ryawtgt, for example, using a predetermined feedback control expression like Expression (4). In Expression (4), ΔRyaw represents a yaw rate deviation (=Ryawtgt-Ryaw) between the target yaw rate Ryawtgt and the actual yaw rate Ryaw, Kp represents a predetermined proportional coefficient, Kd represents a predetermined differential coefficient, and Ki represents a predetermined integral coefficient.

$$Mreq = Kp \times \Delta Ryaw + Kd \times (d\Delta Ryaw/dt) + Ki \times (\int \Delta Ryaw\, dt) \quad (4)$$

When it is determined by the vehicle behavior determining unit 108 that the vehicle behaves in any of the understeering state and the oversteering state, the transmission torque computing unit 112 calculates the transmission torque (left clutch torque) Tcl of the first coupling 62 and the transmission torque (right clutch torque) Tcr of the second coupling 64, which are necessary for acquiring the required yaw moment Mreq with the optimal front/rear-wheel driving power distribution. Specifically, predetermined operational expressions like Expressions (8) and (9) for calculating the driving power (left-rear wheel driving power) Frl of the left rear wheel 16L and the driving power (right-rear wheel driving power) Frr of the right rear wheel 16R, which are necessary for acquiring the required yaw moment Mreq with the optimal front/rear-wheel driving power distribution, are derived from predetermined simultaneous equations like Expressions (5) to (7). The transmission torque computing unit 112 calculates a left clutch torque Tcl and a right clutch torque Tcr on the basis of total vehicle driving power Fall, a dynamic front-wheel grounding load sharing ratio i, a tire dynamic load radius rt, the required yaw moment Mreq computed by the required yaw moment computing unit 110, and a tread width (the length between the center in the tire width direction of the left-rear wheel 16L and the center in the tire width direction of the right-rear wheel 16R) Tr of the vehicle 10 using predetermined operational expressions like Expressions (10) and (11) derived from the operational expressions like Expressions (8) and (9). In Expressions (5) to (7), Ff represents the total driving power of the front wheels 14R, 14L. The transmission torque computing unit 112 computes the total vehicle driving power Fall on the basis of the estimated engine torque Tep computed by the 4WD driving power computing unit 104, the total gear ratio i total in the power transmission path from the engine 14 to the drive wheels, and the tire dynamic load radius rt, for example, using a predetermined operational expression like Expression (12). The transmission torque computing unit 112 computes the dynamic front-wheel grounding load sharing ratio i on the basis of a static front-wheel grounding load Fnf, a static rear-wheel grounding load Fnr, a gravitational center height h of the vehicle 10, the wheelbase L, and the longitudinal acceleration Gx using a predetermined operational expression like Expression (13).

$$Ff + Frl + Frr = Fall \quad (5)$$

$$(Frl - Frr) \times (Tr/2) = Mreq \quad (6)$$

$$Ff : (Frl + Frr) = i : (1-i) \quad (7)$$

$$Frl = Fall \times (1-i)/2 + Mreq/Tr \quad (8)$$

$$Frr = Fall \times (1-i)/2 - Mreq/Tr \quad (9)$$

$$Tcl = Frl \times rt = Fall \times (1-i) \times rt/2 + Mreq/Tr \times rt \quad (10)$$

$$Tcr = Frr \times rt = Fall \times (1-i) \times rt/2 - Mreq/Tr \times rt \quad (11)$$

$$Fall = (Tep \times itotal)/rt \quad (12)$$

$$i = (Fnf - (h/L) \times Gx)/(Fnf + Fnr) \quad (13)$$

When it is determined by the vehicle traveling state determining unit 102 that the traveling state is set to the 4WD traveling state, it is determined by the vehicle traveling state determining unit 102 that the vehicle 10 is steered, and it is determined by the vehicle behavior determining unit 108 that the vehicle behaves in any of the understeering state and the oversteering state, the actuator output instructing unit 106 outputs a command for engaging the rear-side clutch 32 to the rear-side actuator 76 and then outputs a command for generating the transmission torque in only one of the first coupling 62 and the second coupling 64 on the basis of the determined vehicle behavior instead of the normal 4WD switching control routine to the corresponding electromagnetic solenoid. This is to apply a braking force to the rear wheel 16 in which the transmission torque is generated by raising the rotation speed of the propeller shaft 28 of which the rotation is stopped, as well as to achieve synchronization of the rotation speed of the first rotation member 40 and the rotation speed of the second rotation member 42 similarly to the normal 4WD switching control routine. Therefore, when the determined vehicle behavior is the understeering state, the actuator output instructing unit 106 outputs a command for generating the transmission torque in the coupling on the inner wheel side in the turning direction based on the steering direction of the steering wheel 99 out of the first coupling 62 and the second coupling 64 to the corresponding electromagnetic solenoid. Accordingly, the turning yaw moment is generated and the understeering is suppressed. On the other hand, when the determined vehicle behavior is the oversteering state, the actuator output instructing unit 106 outputs a command for generating the transmission torque in the coupling on the outer wheel side in the turning direction based on the steering direction of the steering wheel 99 out of the first coupling 62 and the second coupling 64 to the corresponding electromagnetic solenoid. Accordingly, the turning anti-yaw moment is generated and the oversteering is suppressed. When the coupling is engaged and the propeller shaft rotation speed Np is raised, the braking force does not act. Therefore, the transmission torque generated in only one of the first coupling 62 and the second coupling 64 may employ the left clutch torque Tcl or the right clutch torque Tcr computed by the transmission torque computing unit 112, but it is preferable that the value or the generation rate vary depending on the vehicle behavior (for example, depending on the magnitude of the yaw rate deviation ΔRyaw).

When the command for generating the transmission torque in only one of the first coupling 62 and the second coupling 64 is output to the corresponding electromagnetic solenoid, the actuator output instructing unit 106 outputs the command for engaging the front-side clutch 44 to the front-side actuator 56 after it is determined by the vehicle traveling state determining unit 102 that the rotation speed of the first rotation member 40 and the rotation speed of the second rotation member 42 are substantially synchronized with each other, similarly to the above-mentioned normal 4WD switching control routine. Thereafter, the actuator output instructing unit 106 outputs the commands for generating the transmission torques in the first coupling 62 and the second coupling 64 to the corresponding electromagnetic solenoids so as to achieve the left clutch torque Tcl and the right clutch torque Tcr computed by the transmission torque computing unit 112. As a result, for example, when it is determined that the vehicle behaves in the understeering state, the coupling on the inner wheel side of the turning direction which is engaged by the command for generating the transmission torque in only the one coupling is controlled so as to be disengaged and the coupling on the outer wheel side in the turning direction is controlled so as to be engaged. On the other hand, for example, when it is determined that the vehicle behaves in the oversteering state, the coupling on the inner wheel side in the turning direction is controlled so as to be engaged. The above-mentioned adjustment of the clutch torque is only an example, and the transmission torque only has to be generated in the first coupling 62 and the second coupling 64 so as to finally achieve the left clutch torque Tcl and the right clutch torque Tcr computed by the transmission torque computing unit 112.

Figure 3:
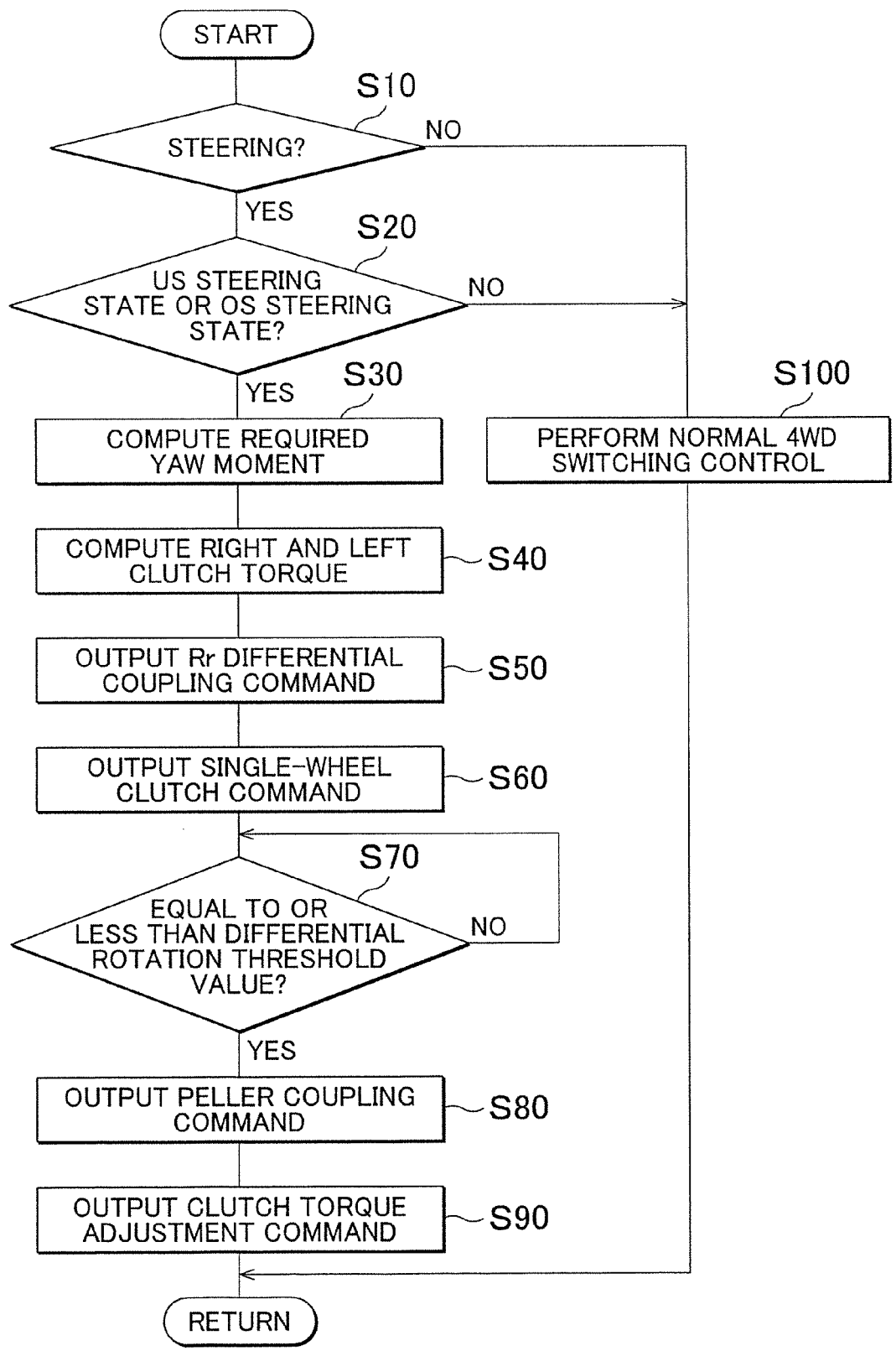
FIG. 3 is a flowchart illustrating a principal part of a control operation, that is, a control operation for generating a yaw moment corresponding to steering at the time of switching from a 2WD_d traveling state to a 4WD traveling state, of the electronic control unit.
Figure 4:
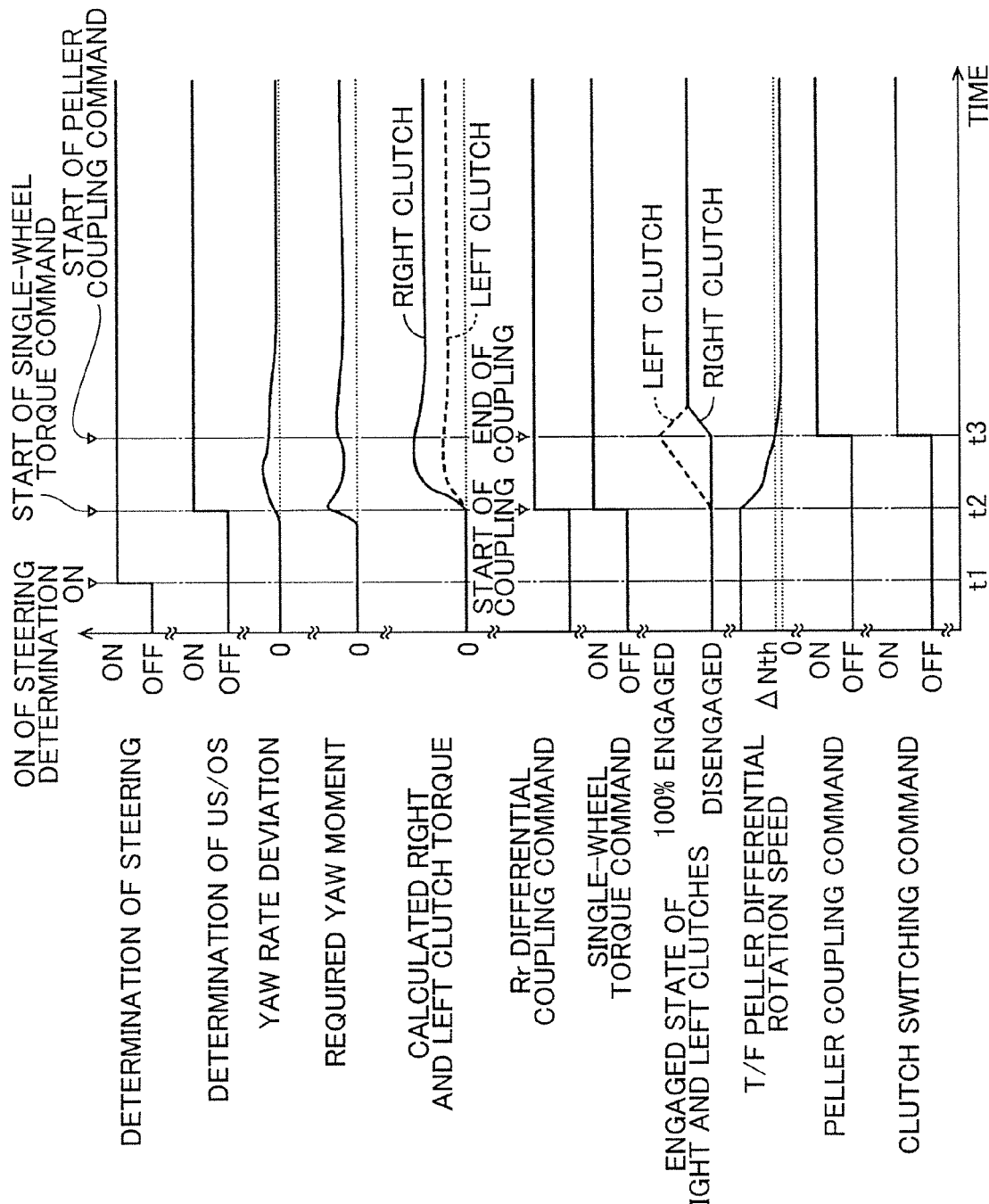
FIG. 4 is a timing chart illustrating an example where the control operation illustrated in the flowchart of FIG. 3 is performed.

FIG. 3 is a flowchart illustrating a principal part of the control operation, that is, the control operation for generating the yaw moment corresponding to the steering at the time of switching from the 2WD_d traveling state to the 4WD traveling state (particularly, for appropriately suppressing the generated understeering or oversteering), of the electronic control unit 100, which is repeatedly performed, for example, at a very short cycle of about several msec to several tens of msec. FIG. 4 is a timing chart illustrating an example where the control operation illustrated in the flowchart of FIG. 3 is performed, where it is assumed that the understeering is generated at the time of steering for the left turn. The flowchart illustrated in FIG. 3 is started on the premise that it is determined by the vehicle traveling state determining unit 102 that the traveling state of the vehicle 10 should be set to the 4WD traveling state and thus the switching control from the 2WD_d traveling state to the 4WD traveling state is performed.

In FIG. 3, first, in step (hereinafter, step is omitted) S10 corresponding to the vehicle traveling state determining unit 102, for example, it is determined whether the vehicle 10 of which the steering wheel 99 is operated is steered. When the determination result of S10 is positive (see time t1 in FIG. 4), for example, it is determined whether the vehicle 10 behaves in any of the understeering state and the oversteering state in S20 corresponding to the vehicle behavior determining unit 108. When the determination result of S20 is positive (see time t2 in FIG. 4), the required yaw moment Mreq is calculated on the basis of the yaw rate deviation ΔRyaw, for example, using the feedback control expression like Expression (4) in S30 corresponding to the required yaw moment computing unit 110. Subsequently, in S40 corresponding to the transmission torque computing unit 112, the left clutch torque Tcl in the first coupling 62 and the right clutch torque Tcr in the second coupling 64 are calculated on the basis of the required yaw moment Mreq and the like computed in S30, for example, using the operational expression like Expressions (10) and (11) (see the time subsequent to time t2 in FIG. 4). Subsequently, in S50 corresponding to the actuator output instructing unit 106, for example, the command for engaging the rear-side clutch 32 is output to the rear-side actuator 76. Subsequently, in S60 corresponding to the actuator output instructing unit 106, the command for generating the transmission torque in only one of the first coupling 62 and the second coupling 64 is output to the corresponding electromagnetic solenoid, for example, on the basis of one vehicle behavior of the understeering state and the oversteering state determined in S20 (see time t2 in FIG. 4). Subsequently, in S70 corresponding to the vehicle traveling state determining unit 102, for example, it is determined whether the absolute value of the rotation speed difference between the rotation speed of the first rotation member 40 and the rotation speed of the second rotation member 42 becomes equal to or less than the synchronization determination threshold value ΔNth. S70 is repeatedly performed when the determination result of S70 is negative, but, for example, the command for engaging the front-side clutch 44 is output to the front-side actuator 56 in S80 corresponding to the actuator output instructing unit 106 when the determination result of S70 is positive (see time t3 in FIG. 4). Subsequently, in S90 corresponding to the actuator output instructing unit 106, for example, the commands for generating the transmission torques in the first coupling 62 and the second coupling 64 are output to the corresponding electromagnetic solenoids so as to achieve the left clutch torque Tcl and the right clutch torque Tcr calculated in S40. For example, on the basis of any vehicle behavior of the understeering state and the oversteering state determined in S20, clutch torque adjustment commands (command for switching the engaged state of the first coupling 62 and the second coupling 64) are output to the corresponding electromagnetic solenoids (see the time subsequent to time t3 in FIG. 4). On the other hand, when any of the determination result of S10 and the determination result of S20 is negative, a normal 4WD switching control for switching the 2WD_d traveling state to the 4WD traveling state is performed, for example, in accordance with the above-mentioned normal 4WD switching control routine in S100 corresponding to the 4WD driving power computing unit 104 and the actuator output instructing unit 106.

In FIG. 4, since the vehicle behaves in the understeering state at the time of steering for the left turn, a single-wheel clutch torque command for generating the transmission torque in the first coupling 62 on the inner wheel side in the left turning direction is output (time t2). Accordingly, the rotation speed of the propeller shaft 28 of which the rotation is stopped is raised and the absolute value of the rotation speed difference (T/F-peller differential rotation speed) between the rotation speed of the first rotation member 40 and the rotation speed of the second rotation member 42 gradually decreases. The turning yaw moment is generated by the braking force acting on the left-rear wheel 16L and thus the understeering is suppressed. When the T/F-peller differential rotation speed becomes equal to or less than the synchronization determination threshold value ΔNth, the front-side clutch 44 is engaged and the clutch torque adjustment command for switching the engaged state of the first coupling 62 and the second coupling 64 is output (time t3). Accordingly, the first coupling 62 in the almost completely-engaged state is controlled so as to be disengaged and the second coupling 64 on the outer wheel side in the left turning direction is controlled so as to be engaged. The transmission torques are generated in the first coupling 62 and the second coupling 64 so as to achieve the left clutch torque Tcl and the right clutch torque Tcr necessary for acquiring the required yaw moment Mreq.

As described above, according to this embodiment, when the traveling state is switched from the 2WD_d traveling state to the 4WD traveling state, first, only one or both of the first coupling 62 and the second coupling 64 are controlled so as to be engaged, and thus the rotation speed of the propeller shaft 28 of which the rotation is substantially stopped can be raised so that the rotation speed of the propeller shaft 28 side of the front-side clutch 44 increases toward the rotation speed of the engine 12 side of the front-side clutch 44. Accordingly, it is possible to decrease the differential rotation speed of the front-side clutch 44 and thus to rapidly engage the front-side clutch 44. Particularly, at the time of steering, since only one clutch of the first coupling 62 and the second coupling 64 is engaged, interference with the turning becomes more difficult compared with a case where both couplings 62, 64 are uniformly engaged. When only one of the first coupling 62 and the second coupling 64 is controlled so as to be engaged in a state where the front-side clutch 44 is not engaged, a braking force acts on the rear wheel 16 on the side in which the corresponding one of the first coupling 62 and the second coupling 64 is engaged by raising the rotation speed of the propeller shaft 28 of which the rotation is stopped. Accordingly, it is possible to generate a yaw moment. As a result, it is possible to generate a yaw moment corresponding to the steering at the time of switching from the 2WD_d traveling state to the 4WD traveling state.

According to this embodiment, since the transmission torques in both of the first coupling 62 and the second coupling 64 are controlled on the basis of the steering state after the front-side clutch 44 is engaged, appropriate driving power is generated in the vehicle wheels 14, 16. Particularly, at the time of steering, it is possible to generate the yaw moment using the driving power generated in the right and left rear wheels 16L, 16R. Accordingly, it is possible to generate a yaw moment corresponding to the steering at the time of switching from the 2WD_d traveling state to the 4WD traveling state.

According to this embodiment, the transmission torques generated in both of the first coupling 62 and the second coupling 64 after front-side clutch 44 is controlled so as to be engaged are transmission torques for transmitting dynamic power of the engine 12 to the rear wheels 16 so as to cause the vehicle behavior to approach the target vehicle turn based on the steering angle θsw. Accordingly, after the front-side clutch 44 is engaged, appropriate driving power is generated in the vehicle wheels 14, 16 even in a non-steered state in which the steering angle θsw is substantially zero. Particularly, at the time of steering, it is possible to generate the yaw moment based on the steering angle θsw using the driving power generated in the right and left rear wheels 16R, 16L.

According to this embodiment, the front-side clutch 44 is a dog clutch. Accordingly, by controlling only one or both of the first coupling 62 and the second coupling 64 so as to be engaged, the control routine of engaging the front-side clutch 44 after raising the rotation speed of propeller shaft 28 of which the rotation is stopped is useful. That is, by this control routine, the front-side clutch 44 can be engaged in a state where the differential rotation speed in the front-side clutch 44 is suppressed.

According to this embodiment, only the coupling on the side in which the turn corresponding to the steering is realized out of the first coupling 62 and the second coupling 64 is controlled so as to be engaged before controlling the front-side clutch 44 so as to be engaged. Accordingly, interference with the turning becomes difficult at the time of steering. A braking force acts on the rear wheel 16 on the side in which the one coupling is engaged and it is thus possible to generate a yaw moment corresponding to the steering.

According to this embodiment, at the time of steering, it is determined whether the steering state is the understeering state or the oversteering state and only the coupling on the side in which the determined understeering or oversteering state is suppressed out of the first coupling 62 and the second coupling 64 is controlled so as to be engaged before the front-side clutch 44 is controlled so as to be engaged. Accordingly, it is difficult to interfere with the turning at the time of steering. A braking force acts on the rear wheel 16 on the side in which the one coupling is engaged and it is thus possible to generate the yaw moment for suppressing the generated understeering or oversteering.

According to this embodiment, both of the first coupling 62 and the second coupling 64 are controlled so as to be engaged before controlling the front-side clutch 44 so as to be engaged in a state other than the steering state. Accordingly, it is possible to raise the rotation speed of the propeller shaft 28 of which the rotation is substantially stopped and thus to engage the front-side clutch 44 in a state where the differential rotation speed in the front-side clutch 44 is suppressed.

While the embodiment of the invention has been described in detail with reference to the accompanying drawings, the invention may be modified in other aspects.

For example, in the above-mentioned embodiment, it is determined whether the vehicle behaves in any of the understeering state and the oversteering state. Such vehicle behavior is not limited to only the time in which the vehicle turns. For example, even when the steering wheel 99 is operated and thus the steering angle θsw is not zero, the vehicle 10 may run substantially straight, in which it is not determined that the vehicle 10 is turning, due to the generated understeering. Therefore, the condition for embodying the operation of controlling only one of the first coupling 62 and the second coupling 64 so as to be engaged is not limited to only the time in which the vehicle 10 is turning, but may be the time in which the vehicle 10 is steered. Even when the vehicle does not behave in any of the understeering state or the oversteering state at the time of steering, a routine of controlling only one coupling so as to be engaged may be performed instead of the normal 4WD switching control routine. In this case, S20 in the flowchart illustrated in FIG. 3 may be skipped.

As described in the above-mentioned embodiment, when the rear-side clutch 32 is engaged and the front-side clutch 44, the first coupling 62, and the second coupling 64 are disengaged, the vehicle 10 can be switched to the same state as the disconnected state. Therefore, even when the vehicle 10 does not include the rear-side clutch 32, the 2WD_d traveling state can be achieved. That is, the first coupling 62 and the second coupling 64 serve as the disconnection mechanism. Therefore, the invention can be applied to even the vehicle 10 not including the rear-side clutch 32. In the vehicle 10 not including the rear-side clutch 32, dragging of the wet multi-disc clutches constituting the couplings occur even when the first coupling 62 and the second coupling 64 are disengaged in the 2WD_d traveling state. Accordingly, there is a possibility that the rotation of a predetermined rotation element will not be completely stopped. The disconnection mechanism preferably is a mechanism that stops the rotation of the predetermined rotation element, but includes a mechanism that allows slight rotation due to the dragging or the like. The rear-side clutch 32 is useful in that the rotation due to the dragging or the like is prevented.

In the above-mentioned embodiment, the first coupling 62 and the second coupling 64 are electronically-controlled couplings, but are not limited thereto. For example, the first coupling 62 and the second coupling 64 may be a known hydraulic frictional engagement device.

In the above-mentioned embodiment, the rear-side clutch 32 and the front-side clutch 44 are electromagnetic dog clutches, but are not limited thereto. For example, the rear-side clutch 32 and the front-side clutch 44 may be such a type of dog clutches which includes a shift fork for shifting a sleeve in the axial direction and in which the shift fork is driven by an actuator electrically or hydraulically controllable. The rear-side clutch 32 and the front-side clutch 44 are dog clutches, but are not limited thereto. The rear-side clutch 32 and the front-side clutch 44 only have to have a configuration capable of connecting and disconnecting rotation elements.

In the above-mentioned embodiment, the vehicle 10 has a structure in which dynamic power is normally transmitted to the front wheels 14 and the rear wheels 16 serve as the secondary drive wheels, but is not limited to this structure. For example, the vehicle 10 may have a structure in which dynamic power is normally transmitted to the rear wheels 16 and the front wheels 14 serve as the secondary drive wheels. For example, the vehicle 10 may be a FR-based four-wheel-drive vehicle.

In the above-mentioned embodiment, the required yaw moment computing unit 110 calculates the required yaw moment Mreq, for example, using the feedback control expression like Expression (4), but is not limited thereto. For example, a predetermined required yaw moment Mreq based on the yaw rate deviation ΔRyaw may be calculated by a feedforward control instead of the feedback control. In this case, as a result, the transmission torque generated in both of the first coupling 62 and the second coupling 64 after controlling the front-side clutch 44 so as to be engaged is a predetermined transmission torque based on the steering angle θsw. In this case, appropriate driving power is generated in the vehicle wheels 14, 16 even in a non-steered state in which the steering angle θsw is substantially zero. Particularly, at the time of steering, it is possible to generate the yaw moment based on the steering angle θsw using the driving power generated in the right and left rear wheels 16R, 16L. The feedback control and the feedforward control may be combined.

The flowchart of FIG. 3 in the above-mentioned embodiment is started on the premise that a switching control from the 2WD_d traveling state to the 4WD traveling state is performed, but is not limited thereto. In an aspect, for example, the switching from the 2WD_d traveling state to the 4WD traveling state may be determined on the condition that the determination results of S10 and S20 in the flowchart of FIG. 3 are both positive and S30 to S90 may be performed at the time of switching to the 4WD traveling state when this condition is satisfied. In this case, S100 may be skipped.

In the flowchart of FIG. 3 in the above-mentioned embodiment, S20 or S100 may be skipped as described above, performing of S40 only has to be completed before performing S90, or the order of the steps or the like may be appropriately changed within an allowable scope.

The above-mentioned embodiment is only an example and the invention can be modified in various aspects by those skilled in the art.

What is claimed is:

1. A control system for a four-wheel-drive vehicle including a driving power source, primary drive wheels, secondary drive wheels, and a rotation member, the control system comprising:
a transfer connected to the rotation member that is a part of a first power transmission path between the driving power source and the primary driving wheels, the transfer configured to distribute dynamic power of the driving power source to the secondary drive wheels;
a driving power transmission shaft configured to transmit the dynamic power of the driving power source distributed by the transfer to the secondary drive wheels;
a clutch mechanism disposed in a second power transmission path between the rotation member and the driving power transmission shaft, the clutch mechanism configured to cut off and set up the second power transmission path;
a first clutch disposed in a third power transmission path between the driving power transmission shaft and a left wheel of the secondary drive wheels, the first clutch configured to change a transmission torque;
a second clutch disposed in a fourth power transmission path between the driving power transmission shaft and a right wheel of the secondary drive wheels, the second clutch configured to change a transmission torque;
an electronic control unit configured to switch, on the basis of a vehicle traveling state, between a two-wheel-drive traveling state in which the clutch mechanism, the first clutch, and the second clutch are disengaged and a four-wheel-drive traveling state in which the clutch mechanism, the first clutch, and the second clutch are engaged, and
the electronic control unit configured, when switching from the two-wheel-drive traveling state to the four-wheel-drive traveling state, to control the clutch mechanism so as to engage the clutch mechanism after controlling at least one of the first clutch and the second clutch so as to engage the at least one of the first clutch and the second clutch on the basis of a steering state.

2. The control system according to claim 1, wherein the electronic control unit is configured to control the clutch mechanism so as to engage the clutch mechanism and then to control both of the first clutch and the second clutch so as to generate the transmission torque in both of the first clutch and the second clutch on the basis of the steering state.

3. The control system according to claim 2, wherein the transmission torque generated in both of the first clutch and the second clutch after the electronic control unit controls the clutch mechanism to engage the clutch mechanism is a predetermined transmission torque based on a steering angle.

4. The control system according to claim 2, wherein the transmission torque generated in both of the first clutch and the second clutch after the electronic control unit controls the clutch mechanism to engage the clutch mechanism is a transmission torque that transmits the dynamic power of the driving power source to the secondary drive wheels so as to cause vehicle behavior to approximate a target vehicle turn based on a steering angle.

5. The control system according to claim 1, wherein the clutch mechanism is a dog clutch.

6. The control system according to claim 1, wherein, when the four-wheel-drive vehicle is steered, the electronic control unit is configured to control one of the first clutch and the second clutch, having a turn closer to a turn corresponding to steering than the other one of the first clutch and the second clutch, so as to engage the one of the first clutch and the second clutch before controlling the clutch mechanism so as to engage the clutch mechanism.

7. The control system according to claim 1, wherein, when the four-wheel-drive vehicle is steered, the electronic control unit is configured to determine whether the steering state is an understeering state or an oversteering state and to control one of the first clutch and the second clutch, which suppresses the determined understeering state or the determined oversteering state more than the other one of the first clutch and the second clutch, so as to engage the one of the first clutch and second clutch before controlling the clutch mechanism so as to engage the clutch mechanism.

8. The control system according to claim 1, wherein the electronic control unit is configured, when the four-wheel-drive vehicle is not steered, to control both of the first clutch and the second clutch so as to engage both of the first clutch and the second clutch before controlling the clutch mechanism so as to engage the clutch mechanism.

* * * * *